(12) United States Patent
Iwasaki

(10) Patent No.: US 7,607,675 B2  
(45) Date of Patent: Oct. 27, 2009

(54) SUSPENSION FORK FOR BICYCLE

(75) Inventor: Yoshihisa Iwasaki, Gojyo (JP)

(73) Assignee: Sakae Engineering Inc., Chiba (JP)

( * ) Notice: Subject to any disclaimer, the term of this patent is extended or adjusted under 35 U.S.C. 154(b) by 158 days.

(21) Appl. No.: 11/792,872

(22) PCT Filed: Mar. 7, 2005

(86) PCT No.: PCT/JP2005/003925

§ 371 (c)(1),
(2), (4) Date: Jun. 12, 2007

(87) PCT Pub. No.: WO2006/095407

PCT Pub. Date: Sep. 14, 2006

(65) Prior Publication Data

US 2008/0001382 A1    Jan. 3, 2008

(51) Int. Cl.
*B62K 25/08* (2006.01)

(52) U.S. Cl. .................................... 280/276

(58) Field of Classification Search ......... 280/275–276, 280/284, 283, 278–279; 267/220, 64.12; 188/300

See application file for complete search history.

(56) References Cited

U.S. PATENT DOCUMENTS 3,979,109 A * 9/1976 Ishida ..................... 293/124
6,260,870 B1 * 7/2001 Fan ........................ 280/276

FOREIGN PATENT DOCUMENTS

JP        49-111342      10/1974
JP         3022037       12/1995
JP      2004-345366      12/2004

OTHER PUBLICATIONS

International Search Report.

* cited by examiner

*Primary Examiner*—Lesley D Morris
*Assistant Examiner*—Levon Fiore
(74) *Attorney, Agent, or Firm*—Bucknam and Archer

(57) ABSTRACT

A fixed member is non-rotatably attached to a suspension fork, and a rotatably installed movable member is attached to the fixed member so as to be operable in the up-down direction. An index mechanism enables the state of the movable member to be selected from either a state in which the movable member is movable in the up-down direction or a state in which the movable member is not movable in the up-down direction. The index mechanism is adapted so that, in the middle of the states, it cannot hold the relative positional relationship between the fixed member and the movable member. The suspension fork for a bicycle is inexpensive, easy to produce, and has a reliable lock function.

3 Claims, 7 Drawing Sheets

SUSPENSION FORK FOR BICYCLE

CROSS REFERENCE TO RELATED APPLICATIONS

Applicant claims priority under 35 U.S.C. §119 of PCT/JP2005/003925 filed Mar. 7, 2005. Applicant also claims priority under 35 U.S.C. §365 of WO 2006/095401 filed Sep. 14, 2006. The international application under PCT article 21(2) was not published in English.

TECHNICAL FIELD

The present invention relates to a suspension fork for a bicycle.

BACKGROUND ART

In recent years, bicycle suspension forks capable of locking the suspension function or regulating the damping force or the amount of stroke have entered the market, and suspension forks have come to be equipped with numerous functions. The number of suspension forks capable of locking the suspension function has grown particularly rapidly, and locking mechanisms have been needed even for the low price range.

However, most conventional structures for locking the suspension function have oil enclosed within a cartridge or within the suspension fork itself. By preventing the oil from flowing, movement in the vertical direction is prevented.

SUMMARY OF THE INVENTION

Oil is enclosed within a cartridge or within the suspension fork in structures wherein the oil flow is prevented and the suspension function is locked. Extremely high precision is required because consideration must be given to providing a sealed structure that does not leak oil.

A function and structure for selecting a locked or unlocked state is also necessary, but this structure must be made with high precision in an extremely narrow space.

In other words, conventional methods for preventing oil flow and locking the suspension function are extremely costly, and production volume is also limited.

The present invention summarily solves the aforementioned problems and provides a generalized, reliable mechanism for locking a suspension function at lower cost and with greater suitability for mass production.

In order to achieve the aforementioned object, a suspension fork of the present invention comprises: a fixed member that is non-rotatably attached to the suspension fork; and a movable member that is rotatably attached to the fixed member and is capable of movement in a vertical direction, wherein a state in which movement in the vertical direction is allowed and a state in which movement in the vertical direction is not allowed can be selected by selecting a relative positional relationship of the fixed member and the movable member.

More specifically, in order to guarantee reliable functionality and ease of use, comprises an index mechanism for reliably holding a lock function in an on position or an off position; an angularly profiled convexo-concave part that is provided to one of the fixed member or the movable member so that the index mechanism is incapable of holding an intermediate state between the state in which movement in the vertical direction is allowed and the state in which movement in the vertical direction is not allowed; and an auxiliary member that forms a angularly profiled convexo-concave part engaged with the convexo-concave part and that is non-rotatably provided to the fixed member or the movable member so as to be capable of movement in the vertical direction.

In order to ensure strength when locked, one member from among the fixed member and the movable member is made to be fit into an inside-diameter part of the other member in the in which movement in the vertical direction is allowed; the fixed member or the movable member on the side of the inside diameter is provided with substantially ribbon shape in order to maximally increase the size of a contact surface between the fixed member and the movable member during the state in which movement in the vertical direction is not allowed; and an impact-attenuating member is provided to an end part of the fixed member and/or to an end part of the movable member and/or to the contact surface between the fixed member and the movable member in order to dampen shock from a road surface in during the state in which movement in the vertical direction is not allowed.

Most conventional structures for locking a suspension function have oil enclosed within a cartridge or within the suspension fork itself. By preventing the oil from flowing, movement in the vertical direction is prevented. Oil is enclosed within a cartridge or within the suspension fork in structures wherein the oil flow is prevented and the suspension function is locked. Extremely high precision is required because consideration must be given to providing a sealed structure that does not leak oil. A function and structure for selecting a locked or unlocked state is also necessary, but this structure must be made with high precision in an extremely narrow space. In other words, conventional methods for preventing oil flow and locking the suspension function are extremely costly, and production volume is also limited.

The present invention summarily solves the aforementioned problems and provides a generalized, reliable mechanism for locking a suspension function at lower cost and with greater suitability for mass production.

In other words, a suspension fork is made to comprise: a fixed member that is non-rotatably attached to the suspension fork; and a movable member that is rotatably attached to the fixed member and is capable of movement in a vertical direction, wherein a state in which movement in the vertical direction is allowed and a state in which movement in the vertical direction is not allowed can be selected by selecting a relative positional relationship of the fixed member and the movable member. A locking mechanism capable of mass production can be provided at low cost.

In order to provide safe and reliable locking mechanism can be provided. A angularly profiled convexo-concave part is also formed on one of the fixed member or the movable member, and an auxiliary member that forms a angularly profiled convexo-concave part engaged with the aforementioned convexo-concave part is also non-rotatably provided to the other of the fixed member or the movable member so as to be capable of movement in the vertical direction, whereby the index mechanism that is unable to hold the positional relationship of the fixed member and the movable member in an intermediate state is provided. A safer, reliable locking mechanism can thereby be provided at a low cost.

One member from among the fixed member and the movable member is also configured to be fit into an inside-diameter part of the other member, and this inside-diameter part is made to be substantially ribbon shaped, whereby the contact surface between the fixed member and the movable member is increased and adequate strength can be ensured during locking. An impact-attenuating part is provided to the end part of the fixed member and/or to the end part of the movable member and/or to the contact surface between the fixed member and the movable member, whereby impacts that occur during locking can be attenuated. Advantages are accordingly obtained in regard to strength, and good sensitivity is provided during locking.

BEST MODE FOR CARRYING OUT THE INVENTION

Figure 1:
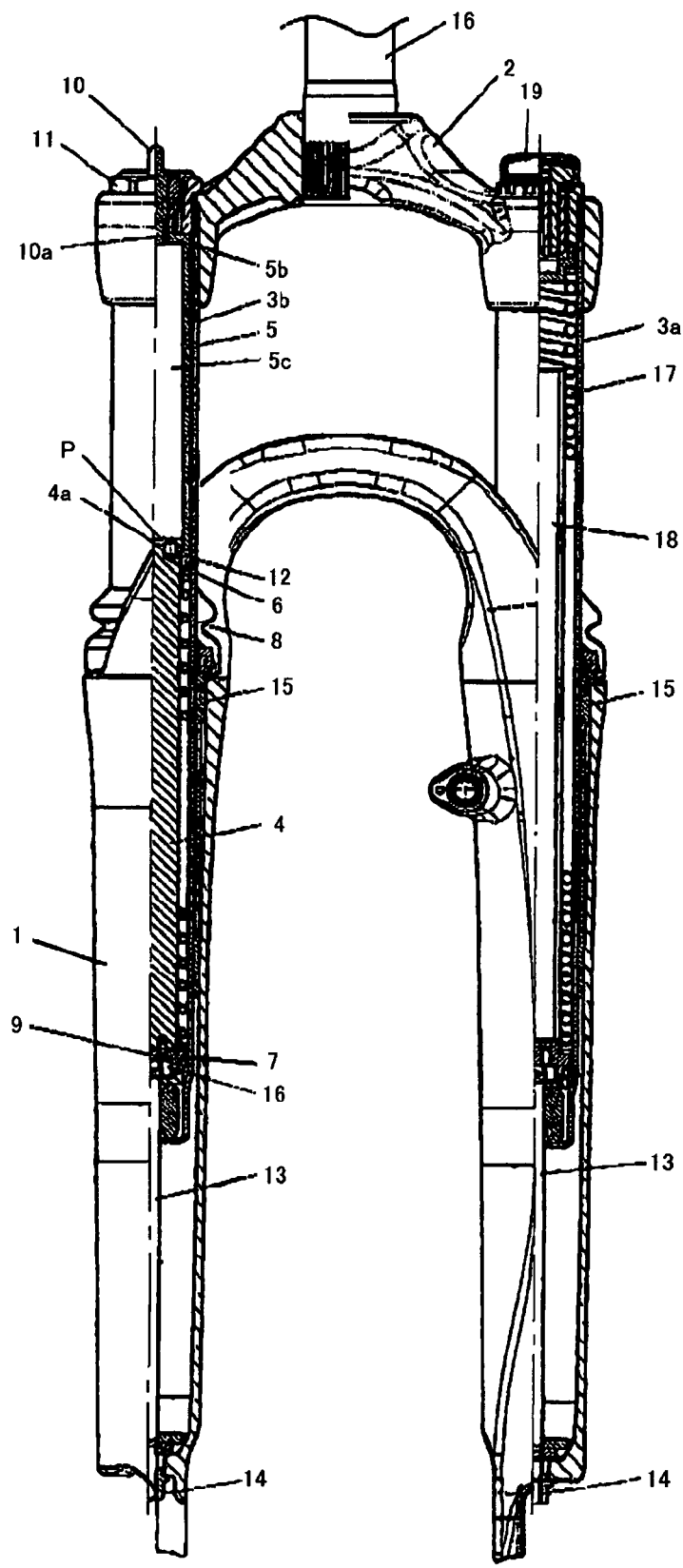
FIG. 1 is a diagram of the suspension fork in an unlocked state.
Figure 2:
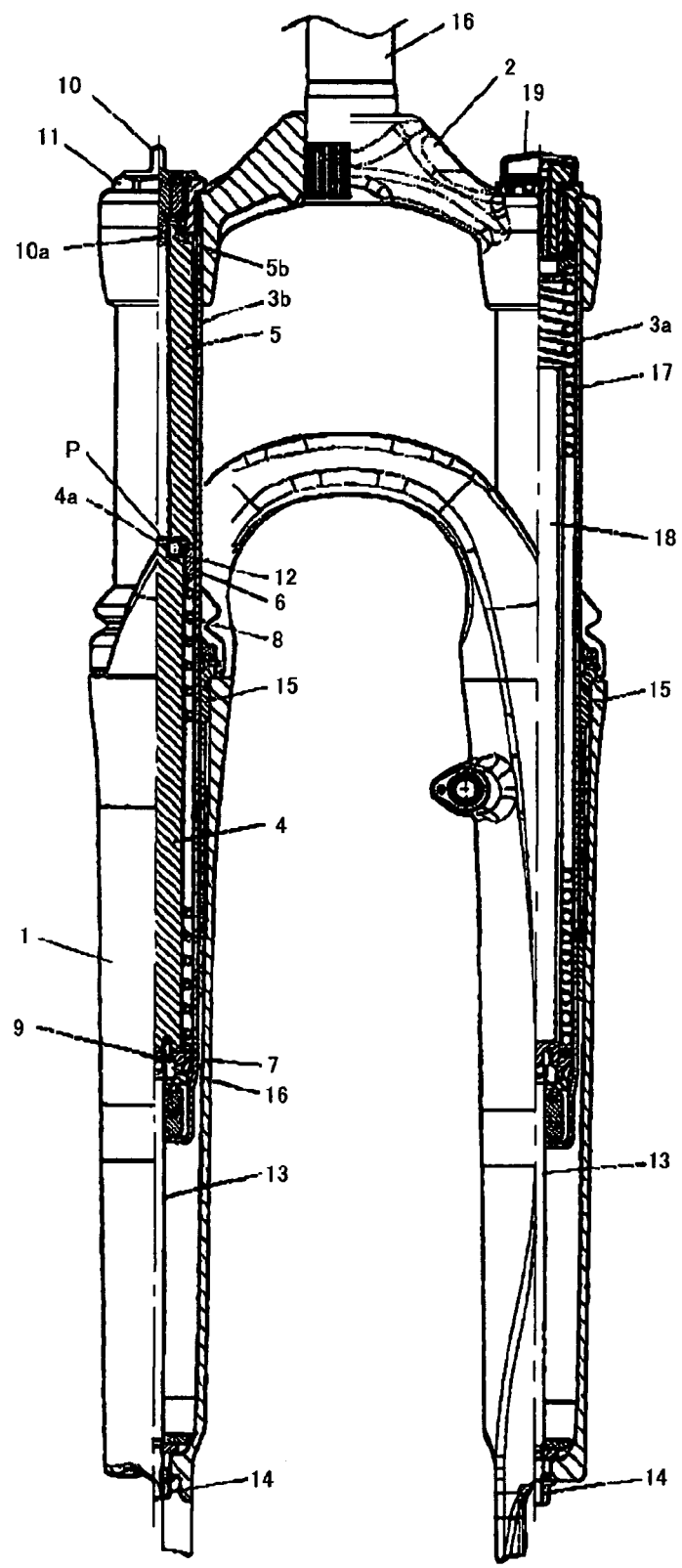
FIG. 2 is a diagram of the suspension fork in a locked state.
Figure 3:
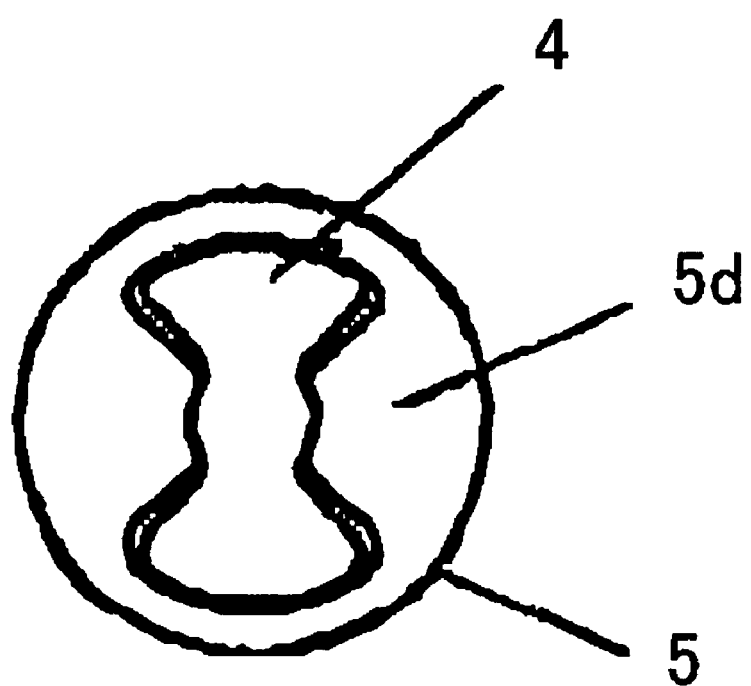
FIG. 3 is a diagram that shows the relationship between the fixed member and the movable member when unlocked.
Figure 4:
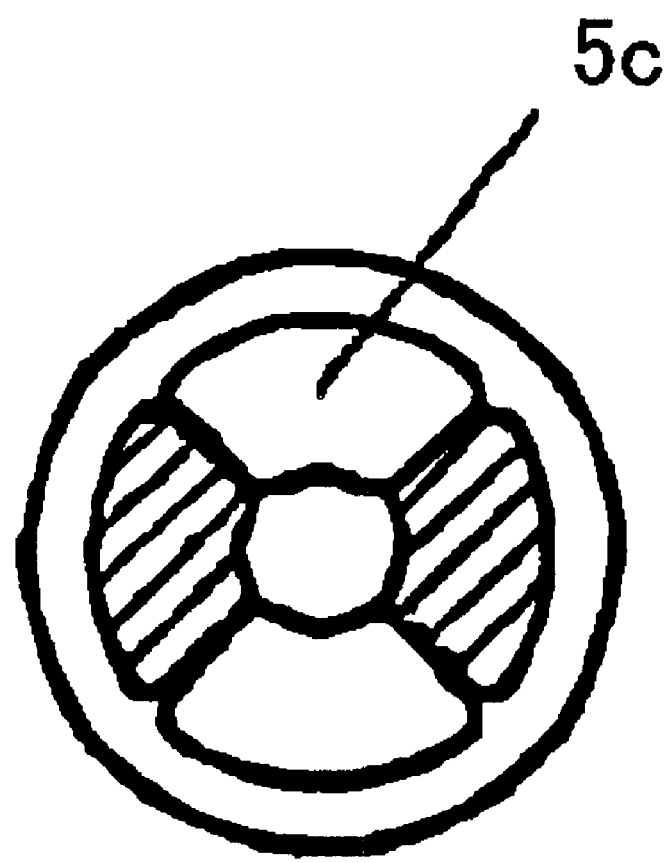
FIG. 4 is a diagram that shows the relationship between the fixed member and the movable member when locked.
Figure 5:
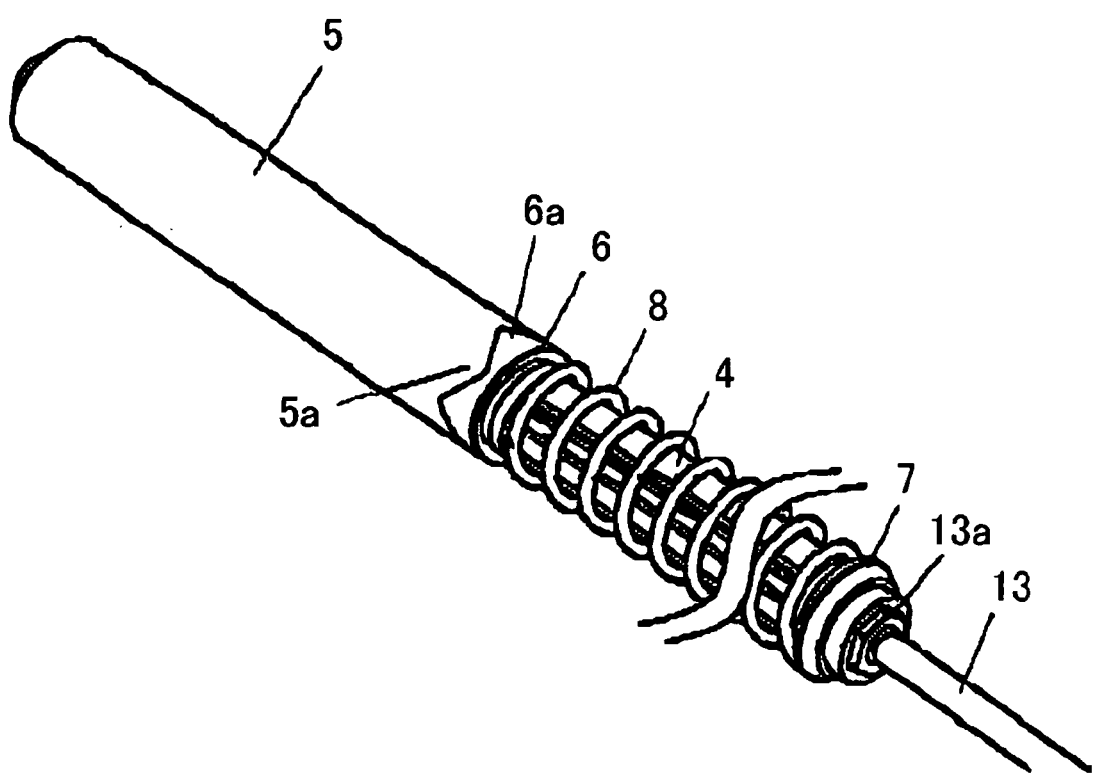
FIG. 5 is an enlarged view of the internal structure in the locked state or the unlocked state.
Figure 6:
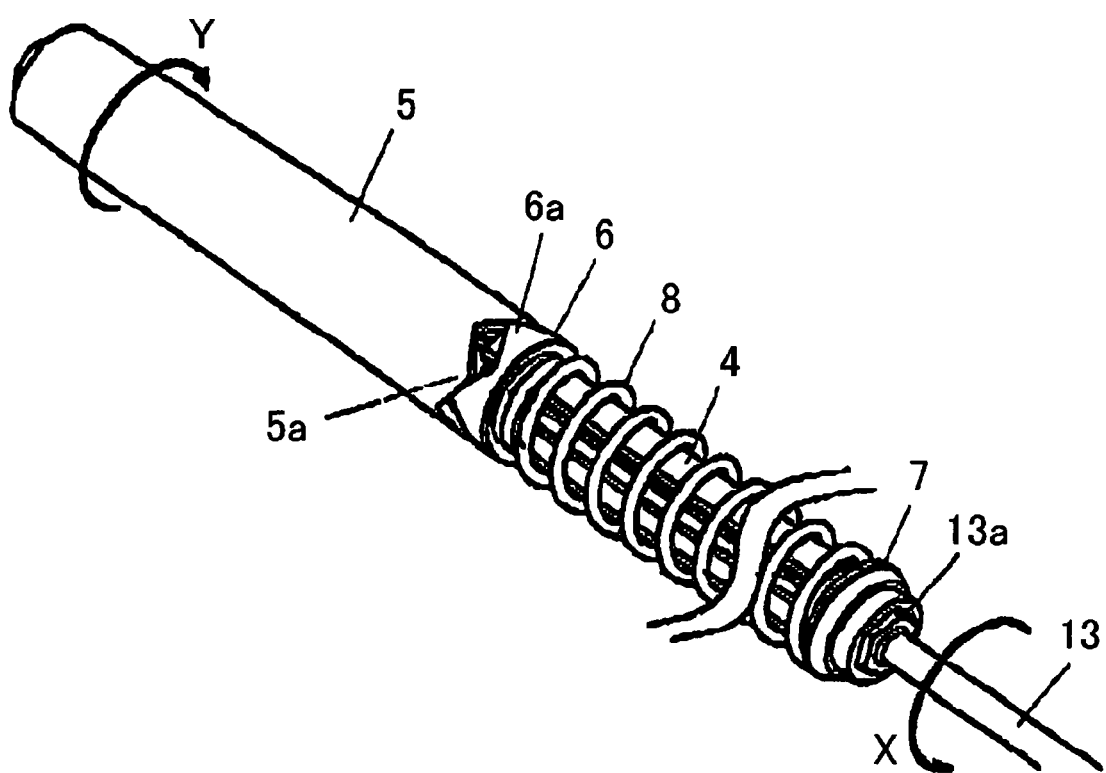
FIG. 6 is a diagram of a state in which the movable member has been rotated 45° from the locked state or the unlocked state.
Figure 7:
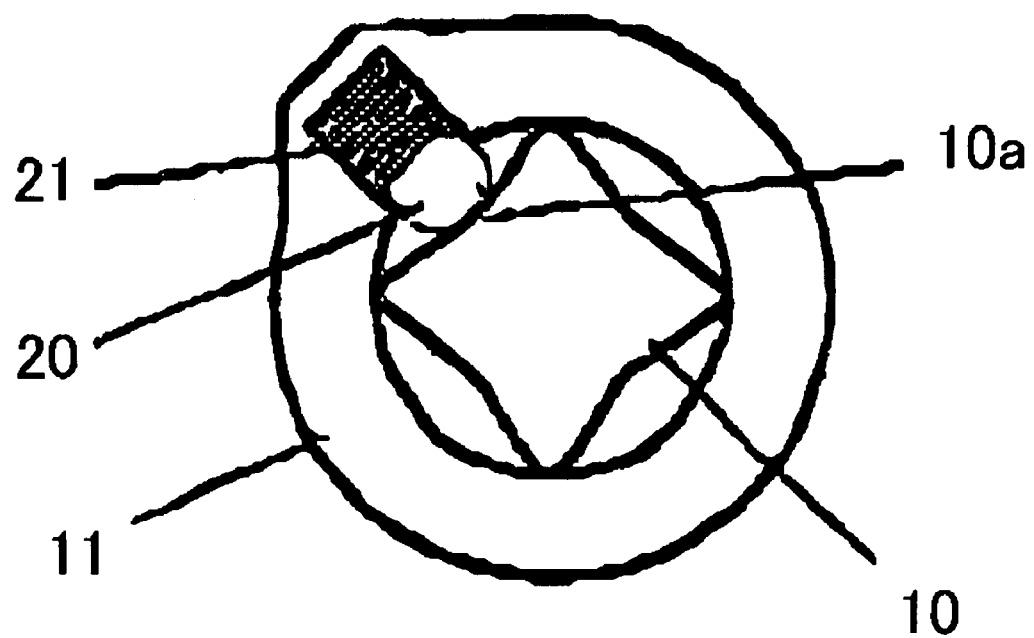
FIG. 7 shows an example of the index mechanism.

Examples of the present invention will be described hereinafter with reference to the drawings. FIG. 1 shows a state in which the suspension function is allowed (an unlocked state) in an embodiment of the bicycle suspension fork of the present invention. FIG. 2 shows a state in which the suspension function is restricted (a locked state). FIG. 3 is a diagram of the relationship between the fixed member and the movable member in the unlocked state. FIG. 4 is a diagram of the relationship between the fixed member and the movable member in the locked state. FIG. 5 shows an example in which the positional relationship of the fixed member and the movable member cannot be maintained in an intermediate state between the state in which movement in the vertical direction is allowed and the state in which movement in the vertical direction is not allowed. FIG. 6 shows the intermediate position between the state in which movement in the vertical direction is allowed and the state in which movement in the vertical direction is not allowed. FIG. 7 shows an example of the index mechanism that is made to be unable to hold the positional relationship of the fixed member and the movable member in an intermediate state.

An embodiment of the present invention shall be described below with reference to FIG. 1. A suspension fork is configured so that fork pipes 3a and 3b are press-fit into a fork crown 2 and inserted through sleeves 15 into bottom cases 1. The suspension fork is assembled using fixing bolts 13 and fixing nuts 14 to allow a specific amount of movement in the vertical direction. A fork stem 16, which is press-fit into the fork crown, is integrated with the head pipe of the bicycle.

A damper 18 and a main spring 17 used for suspension purposes are incorporated with the fork pipe 3a, with the strength of the main spring 17 able to be adjusted via an adjustment knob 19.

A fixed member 4, a movable member 5, an auxiliary member 6, and an auxiliary spring 8 are integrated with the fork pipe 3b.

An auxiliary spring retainer 7 whose bottom part is provided with a hexagonal hole is fixed by a screw 9 to the substantially ribbon-shaped fixed member 4. The hexagonal head part 13a of the fixing bolt 13 is inserted into the hexagonal hole of the auxiliary spring retainer, whereby the fixed member is non-rotatably provided above the fixing bolt.

The auxiliary member 6 is non-rotatably provided to the part above the fixed member so as to be capable of movement in the vertical direction relative to the fixed member 4. An urging force is consistently applied to the upper part of the fixed member by an auxiliary spring 8 that is provided to the outer circumferential part of the fixed member. The inside-diameter part of the auxiliary member is made to be substantially ribbon-shaped like the fixed member, whereby the inside-diameter part of the auxiliary member is made to be non-rotatable relative to the fixed member.

An angularly profiled convexo-concave part 6a is formed on the upper-end surface of the auxiliary member and is configured to engage an angularly profiled convexo-concave part 5a on the bottom part of the movable member.

The angularly profiled convexo-concave part 5a that engages the angularly profiled convexo-concave part 6a of the auxiliary member is formed on the bottom-end surface, and an oblong hole 5b is formed on the upper-end surface. The movable member 5 is provided above the auxiliary member 6, with the inside-diameter part providing a cavity part 5c having the same substantial ribbon shape as the fixed member. The movable member 5 is constantly urged upwards by an urging force provided to the auxiliary member by the auxiliary spring 8 and is in constant contact with a top cap 11 that is screwed onto the fork pipe 3b. In this state, a slight gap P is provided between the upper-end surface 4a of the fixed member and the lower-end surface 5d of the movable member.

A switch knob 10 for the lock function with an oblong distal part 10a is provided to the top cap 11. The oblong distal part 10a is inserted into the oblong hole 5b of the movable member, which can therefore be rotated when the switch knob is turned.

The unlocked state shown in FIG. 1 is used when the bicycle is ridden in a normal state; i.e., in which the suspension function is in operation. The fixed member 4 and the movable member 5 in this state have a positional relationship as shown in FIG. 3; i.e., a positional relationship in which the fixed member can be inserted into the cavity part 5c of the movable member. The suspension fork is therefore in a state capable of movement in the vertical direction.

In this state, the bottom case 1 moves upwards against the main spring 17 when shocks are delivered from below due to unevenness of the road surface. The auxiliary spring 8 not only urges the auxiliary member and the movable member upwards, but also functions as an auxiliary suspension spring at this time.

The oblong distal part 10a of the switch knob is inserted into the oblong hole 5b of the movable member, and the slight gap p is provided between the upper-end surface 4a of the fixed member and the lower-end surface 5d of the movable member. When the switch knob 10 is turned 90°, the movable member therefore also turns 90° without much resistance and enters a state as shown in FIG. 4. Since the movable member is prevented from being inserted into the fixed member in this state, upward movement of the bottom case is also prevented, and the suspension function ceases to work. In other words, the suspension enters the locked state.

The angularly profiled convexo-concave parts 5a, 6a that are mutually engaged at 90° intervals are provided to the movable member 5 and the auxiliary member 6, and therefore the switch knob 10 and the movable member 5 will always turn 90° at a time. When the switch knob has been turned, e.g., 45°, the movable member also turns 45°, and the centers of the angularly profiled slanted surfaces of the movable member and the auxiliary member come into contact, as in FIG. 6. The auxiliary member is constantly urged upwards by the auxiliary spring 8. Therefore, if the hands are withdrawn at this point, the slanted surfaces start to slide while being turned in the X direction in which the angular profiles engage, but the auxiliary member, which is held by the fixed member that is prevented from rotating, will be unable to turn. The movable member will therefore be rotated in the Y direction while moving upwards, and the movable member and the auxiliary member will return to an engaged position as shown in FIG. 5.

In other words, even if an attempt is made to hold the switch knob and the movable member in an intermediate position other than 90°, a correction will automatically be made to the engaged positions at every 90°, and the movable member and the fixed member will be held in the precise positional relationships shown in FIGS. 3 and 4.

In other words, the movable member can only be held in a position allowing insertion into the fixed member or in a position in which the area of the contact surface is largest (the diagonal lines in FIG. 4). The movable member is held in the positions that guarantee the most strength against shock from the road surface when the suspension function is locked.

Even if a special index mechanism is not provided, the structure itself can carry out the indexing role, and extra components and assembly work are therefore not necessary.

The movable member and the auxiliary member can also be made to have flat contacting surfaces without the angularly profiled convexo-concave parts 5a, 6a. Springs and members provided with angular profiles can be provided separately, whereby the positional relationship of the fixed member and the movable member can be made so that intermediate states between the states in which movement in the vertical direction is allowed and the states in which movement in the vertical direction is not allowed are not able to be maintained.

Angularly profiled convexo-concave parts were provided to two members in the present embodiment; i.e., to the movable member and the auxiliary member. However, the identical effect can also be obtained by, e.g., forming one of the members into an angular profile and having a steel ball held in the other member. An identical effect can also be obtained by providing a concave part 10a to the lateral surface of the switch knob 10, as shown in FIG. 7, and using a spring 21 to urge a steel ball 20 to enter the concave part. Thus, the configuration is not limited to what has been described in the present embodiment, and it is acceptable if an intermediate index cannot be maintained.

The angularly profiled concave and convexo-concave parts were provided to mutually engage at 90° intervals in the present embodiment, but it shall be apparent that an angle other than 90° may be used.

In the present invention, a buffer member 12 is provided to the gap P between the lower contact surface 5d of the movable member 5 and the upper lateral surface 4a of the fixed member 4, which are in contact when locked, in order to further reduce shock and unwanted noise from the road surface when the suspension fork is locked. Specifically, the buffer member 12 is provided to the upper-end surface 4a of the fixed member, as shown in FIG. 2. When shock is delivered from the road surface with the suspension fork locked, the movable member moves in a corresponding manner in the direction of the fixed member. First, the movable member contacts the buffer member. Then, once the buffer member has been compressed by a specific amount, the motion of the movable member is stopped by the fixed member, and the suspension fork enters a completely locked state, whereby impact and noise from the road surface can be lessened.

The buffer member 12 can also be provided to the upper-end surface of the movable member and/or to the lower-end surface of the fixed member, whereby impact can be attenuated in the same manner, and strength and durability can be improved.

1 Bottom case
2 Fork crown
3a, 3b Fork pipes
4 Fixed member
5 Movable member
6 Auxiliary member
7 Auxiliary spring retainer
8 Auxiliary spring
9 Screw
10 Switch knob
11 Top cap
12 Buffer member
13 Fixing bolt
14 Fixing nut
15 Sleeve
16 Fork stem
17 Main spring
18 Damper
19 Adjustment knob
20 Steel ball
21 Spring

The invention claimed is:

1. A suspension fork for a bicycle, comprising:
a fixed member and a movable member that are provided to an inside of a bottom case and to a fork pipe of the suspension fork,
the fixed member is non-rotatably attached to the suspension fork;
the movable member is rotatably attached to the fixed member and is capable of movement in a vertical axial direction; and
a state in which movement in the vertical direction is allowed and a state in which movement in the vertical direction is not allowed can be selected by selecting a relative positional relationship of the fixed member and the movable member:
wherein a convexo-concave part is formed on either the fixed member or the movable member; and
an auxiliary member on which is formed a convexo-concave counter part for engaging with said convexo-concave part and which is non-rotatably provided to the other member so as to be capable of movement in the vertical direction, whereby the positional relationship of the fixed member and the movable member is unable to be maintained intermediately between the state in which movement in the vertical direction is allowed and the state in which movement in the vertical direction is not allowed; and
wherein either the fixed member or the movable member on the side of the inside diameter is provided with a ribbon shape and the other with a counter ribbon shape in order to maximally increase the size of a contact surface between the fixed member and the movable member during the state in which movement in the vertical direction is not allowed.

2. The suspension fork for a bicycle according to claim 1, wherein one member of the fixed member and the movable member is configured to be fitted into an inside-diameter part of the other member in the state in which movement in the vertical direction is allowed.

3. The suspension fork for a bicycle according to claim 1, comprising an impact-attenuating member provided to an end part of the fixed member and/or to an end part of the movable member and/or to the contact surface between the fixed member and the movable member in order to dampen shock received during the state in which movement in the vertical direction is not allowed.

* * * * *